United States Patent
Liu et al.

(10) Patent No.: US 10,234,352 B2
(45) Date of Patent: Mar. 19, 2019

(54) DEVICE AND METHOD FOR MEASURING AIR TIGHTNESS OF ALUMINUM ALLOY HUB OR TYRE

(71) Applicant: CITIC Dicastal CO., LTD, Qinhuangdao (CN)

(72) Inventors: Chunhai Liu, Qinhuangdao (CN); Zhigao Yin, Qinhuangdao (CN); Hanbao Sun, Qinhuangdao (CN); Debin Tang, Qinhuangdao (CN); Jinqi Lv, Qinhuangdao (CN); Zhipeng Li, Qinhuangdao (CN); Zhihua Zhu, Qinhuangdao (CN); Yongning Wang, Qinhuangdao (CN); Changhai Li, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 341 days.

(21) Appl. No.: 15/183,899

(22) Filed: Jun. 16, 2016

(65) Prior Publication Data

US 2016/0368332 A1    Dec. 22, 2016

(30) Foreign Application Priority Data

Jun. 16, 2015 (CN) .......................... 2015 1 0331012

(51) Int. Cl.
*G01L 17/00* (2006.01)
*B60C 23/04* (2006.01)

(52) U.S. Cl.
CPC .............. *G01L 17/00* (2013.01); *B60C 23/04* (2013.01)

(58) Field of Classification Search
None
See application file for complete search history.

(56) References Cited

U.S. PATENT DOCUMENTS

| 6,486,771 | B1 * | 11/2002 | Fuller | ................. B60C 23/0408 200/61.22 |
| 7,331,221 | B2 * | 2/2008 | Wise | ....................... B60S 5/046 73/146.3 |
| 9,248,707 | B2 * | 2/2016 | Zhou | ..................... B60C 23/003 |
| 9,259,982 | B2 * | 2/2016 | Paasch | .................... B60C 25/16 |
| 9,701,164 | B2 * | 7/2017 | Hoeldrich | ............... B60C 23/02 |
| 10,035,387 | B2 * | 7/2018 | Carresjo | ............. B60C 23/0462 |
| 2016/0144672 | A1 * | 5/2016 | Wang | .................... B60C 23/001 141/38 |
| 2017/0021683 | A1 * | 1/2017 | Paasch | ..................... B60S 5/04 |

* cited by examiner

*Primary Examiner* — Peter J Macchiarolo
*Assistant Examiner* — Jermaine L Jenkins
(74) *Attorney, Agent, or Firm* — Maier & Maier, PLLC

(57) ABSTRACT

The present invention provides a device for measuring air tightness of an aluminum alloy hub or a tire and a method for measuring the air tightness of the aluminum alloy hub or the tire by using the device. The device includes a pressure measurement device mounted into a hub or tire to be measured, an inflation device in gas connection with an inside of a tire of a wheel to be measured, and a data acquiring and processing device; wherein the inflation device includes a flow measurement component.

5 Claims, 1 Drawing Sheet

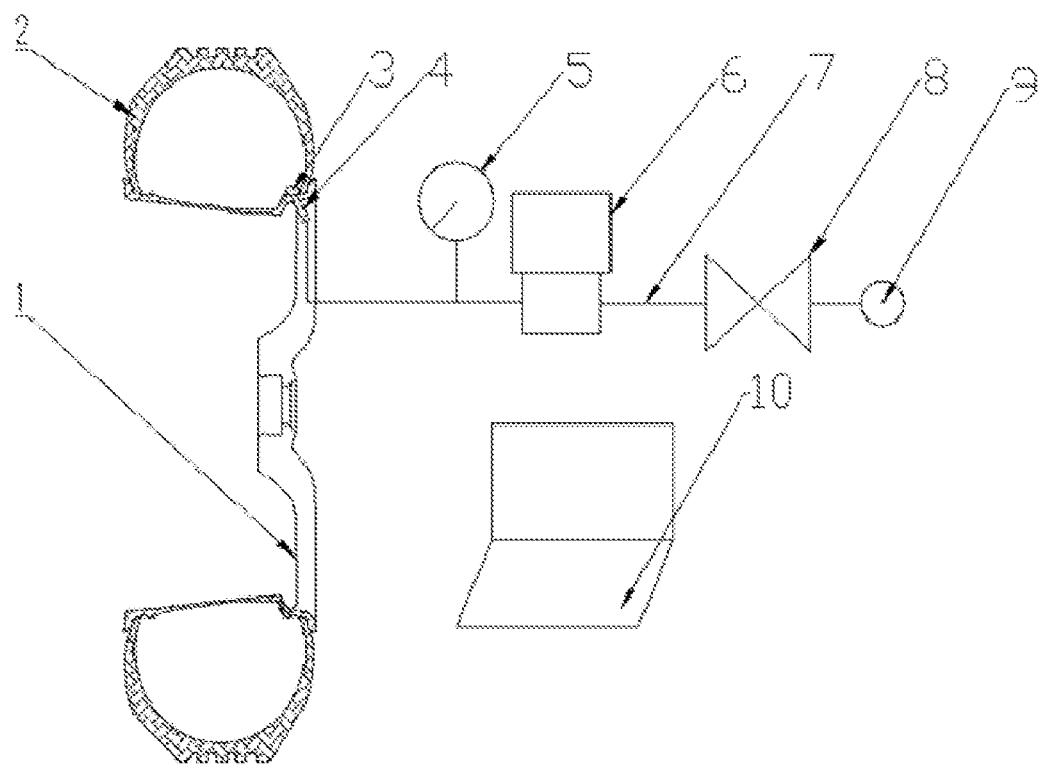

DEVICE AND METHOD FOR MEASURING AIR TIGHTNESS OF ALUMINUM ALLOY HUB OR TYRE

TECHNICAL FIELD

The present invention relates to a detection device for an aluminum alloy air-tightness standard hub and a detection method thereof.

BACKGROUND ART

The air tightness of an aluminum alloy hub is an important index for assessing the performance of the aluminum alloy hub, and methods for detecting the air tightness of the aluminum alloy hub generally include a water based air-tightness detection method and a helium-based air-tightness detection method. The water-based air-tightness detection method is commonly used and has the principle that inner and outer sides of the hub are closed; an inner cavity of a wheel rim is inflated with compressed air under certain pressure; then, the hub is immersed into water; whether air bubbles escape is observed with human eyes; if the air bubbles escape continuously, the air tightness of the hub is indicated to be unqualified; and if no air bubble escapes, the air tightness of the hub can be determined to be qualified. The helium-based air-tightness detection method is to determine the air tightness of the hub by analyzing the quantity of helium molecules with a helium gas as a leakage indication gas and a helium mass spectrometer as a detection member. During the helium-based air-tightness detection, a hub is sealed in an enclosed cover at first; an inner cavity of the hub is firstly vacuumized; then helium gas is charged into an outer cavity of the hub and the enclosed cover; if the hub undergoes leakage, molecules of the helium gas tend to enter the inner cavity of the hub; the helium molecules entered will be extracted into the helium mass spectrometer through a vacuum pump; and the air tightness of the hub is obtained through analysis.

In order to detect the accuracy of the helium-based air tightness detection device, an air-tightness standard hub with very small leakage rate needs to be used as a standard, and the helium-based air-tightness detection device can be calibrated by mounting a standard discharge spout on the air-tightness standard hub. When the standard discharge spout is closed, the leakage rate detected by the helium-based air-tightness detection device tends to be very small, reaching $10^{-12}$ to $10^{-13}$ Pa*m$^3$/s generally; and when the standard discharge spout is opened, the standard leakage rate of the discharge spout shall be detected by the helium-based air-tightness detection device, which is $10^{-6}$ Pa*m$^3$/s generally. Therefore, not only the standard discharge spout but also an air-tightness standard hub needs to be used for calibrating the accuracy of the helium-based air-tightness detection device.

It is known for those of ordinary skill in the detection art that the air-tightness standard hub may be worn or damaged during long-term use, and this may lead to changes in the air-tightness of the air-tightness standard hub, which consequently may be not suitable as the air-tightness standard hub any more. Due to higher requirements for the air-tightness standard hub, the cost on manufacturing and selecting the air-tightness standard hub is higher, and it is impossible to select a large amount of air-tightness standard hubs for frequent replacement. Therefore, there is an urgent need of a detection device having simple structure, convenient operation and accurate detection for the air-tightness standard hub in the actual production.

In some situations, the air-tightness detection is expected to be performed on a small amount of highly required vehicle wheels. This is also in need of a vehicle wheel air-tightness detection device, which is convenient to operate and accurate in measurement.

SUMMARY OF THE INVENTION

Therefore, an object of the present invention is to provide a detection device for an aluminum alloy air-tightness standard hub, which is reusable and good in air tightness, convenient to operate, simple in detection principle and device, and easy to manufacture and popularize. In the meantime, the present invention desires to provide a method with convenience in operation and high accuracy for detecting the aluminum alloy air-tightness standard hub.

In order to achieve the object described above, the present invention provides the following technical solution.

In one aspect of the present invention, a device for measuring air tightness of an aluminum alloy hub or a tyre is provided, which is characterized by comprising a pressure measurement device mounted into a hub or tyre to be measured, an inflation device in gas connection with the inside of a tyre of a wheel to be measured, and a data acquiring and processing device, wherein the inflation device comprises a flow measurement component.

In one preferred aspect of the present invention, the pressure measurement device is a tyre pressure sensor (3) mounted inside a tyre (2) on an aluminum alloy hub (1).

In one preferred aspect of the present invention, the inflation device comprises a pressure gage (5), a gas flowmeter (6), a connection pipeline (7), a shut-off valve (8) and a gas source (9), wherein the pressure gage (5) is in gas connection with the inside of the tyre (2) on the aluminum alloy hub (1) and is in gas connection with the gas flowmeter (6); the gas flowmeter (6) is in gas connection with the shut-off valve (8) through the connection pipeline (7); and the shut-off valve (8) is in gas connection with the gas source (9).

In one preferred aspect of the present invention, the data acquiring and processing device comprises a data acquiring device and a data processing device, wherein the data acquiring device is configured to receive tyre pressure data from the tyre pressure sensor (3), and transmit the tyre pressure data to the data processing device.

In one preferred aspect of the present invention, the data processing device is a single-chip microcomputer.

In one preferred aspect of the present invention, the single-chip microcomputer internally stores a control and analysis software, which is configured to: read temperature from the tyre pressure sensor when the measurement begins, control to inflate enclosed spaces of the tyre and the hub with compressed air when the temperature is stable, close a valve and the shut-off valve when a first pressure $p_1$ is reached within a first time $t_1$, and record an accumulated inflation flow value V within the first time $t_1$; control the device to hold for a second time $t_2$ and record a second pressure $p_2$ within the second time $t_2$, with an interval t between $t_1$ and $t_2$; calculate a leakage rate of the hub according to a formula $L=(p_1-p_2)V/(tp_2)$; output that the air tightness of the hub or tyre to be measured is qualified when L is not larger than $5\times10^{-6}$ Pa*m$^3$/s; and output that the air tightness of the hub or tyre to be measured is unqualified when L is larger than $5\times10^{-6}$ Pa*m$^3$/s.

In one preferred aspect of the present invention, the first pressure $p_1$ is 180 kPa to 220 kPa, and preferably 200 kPa.

In one preferred aspect of the present invention, the tyre pressure sensor (3) is a real-time detection sensor.

In another aspect of the present invention, a method for measuring air tightness of an aluminum alloy hub or a tyre is provided, which comprises the following steps: (1) assembling a wheel or tyre to be measured into a wheel-tyre assembly, mounting the wheel-tyre assembly onto the device as described above, and balancing in a constant-temperature environment; (2) inflating enclosed spaces of the tyre and the hub with compressed air, closing a valve and a shut-off valve when a first pressure $p_1$ is reached within a first time $t_1$, and recording an accumulated inflation flow value V within the first time $t_1$; (3) keeping the device in the step (2) in the constant-temperature environment and recording a second time $t_2$ and a second pressure $p_2$ within the second time $t_2$, with an interval t between $t_1$ and $t_2$; and (4) calculating a leakage rate of the hub according to a formula L=(p1−p2)V/(tp2).

In one preferred aspect of the present invention, the first pressure $p_1$ is 180 kPa to 220 kPa, and preferably 200 kPa.

The technical solution of the present invention has the following advantages:

(1) based on an ideal gas state equation $$pV = \frac{m}{M}RT,$$

the device may calculate the leakage value of the hub in a calculation manner, and thus can be used as a standard component with a traceable magnitude for routine calibration of the helium-based air-tightness detection device;

(2) with the tyre pressure sensor, the tyre gas pressure and temperature in the enclosed space can be acquired and recorded;

(3) with the tyre and the valve, the leakage rate of the enclosed space can approach 0, and meanwhile, materials are readily available;

(4) with the pressure gage and the flowmeter, the gas charged into the enclosed space can be monitored quantitatively, thereby realizing the calculation of the leakage rate;

(5) with the notebook computer, the data can be acquired in real time, thereby facilitating the smooth conduction of the detection and the calculation and storage of the data;

(6) the detection device for the aluminum alloy air-tightness standard sample hub has the characteristics of scientificity, reasonability, simple structure and ease for mounting and adjusting, wherein the minimum leakage rate of the air-tightness standard hub detected by the detection device can reach $10^{-12}$ to $10^{-13}$ Pa*m$^3$/s.

(7) with the design of connecting the pressure gage, the digital flowmeter and the shut-off valve in series, the tyre pressure during inflation as well as the accumulated inflation flow for the tyre and the accumulated inflation time can be obtained, and the volume V of the gas charged into the tyre can be obtained precisely through calculation.

BRIEF DESCRIPTION OF FIGURES

In the following, embodiments of the present invention is illustrated in detail in combination with the drawing, wherein FIG. 1 is a structural schematic diagram of a detection device for an aluminum alloy air-tightness standard sample hub.

Wherein, reference signs are as follows: 1—aluminum alloy hub, 2—tyre, 3—tyre pressure sensor, 4—valve, 5—pressure gage, 6—gas flowmeter, 7—connection pipeline, 8—shut-off valve, 9—gas source and 10—notebook computer.

DETAILED DESCRIPTION OF THE INVENTION

Embodiment 1: Detection Device for Aluminum Alloy Air-Tightness Standard Sample Hub In the following, the detection device for the aluminum alloy air-tightness standard sample hub is illustrated in detail in combination with the drawings.

The detection device for the aluminum alloy air-tightness standard sample hub comprises an aluminum alloy hub 1, a tyre 2, a tyre pressure sensor 3, a valve 4, a pressure gage 5, a gas flowmeter 6, a connection pipeline 7, a shut-off valve 8, a gas source 9 and a notebook computer 10.

The notebook computer 10 internally stores a control and analysis software, which is configured to:

read temperature from the tyre pressure sensor when the measurement begins; control to inflate enclosed spaces of the tyre and the hub with compressed air when the temperature is stable; close the valve and the shut-off valve when a first pressure $p_1$ is reached within a first time $t_1$, and record an accumulated inflation flow value V within the first time $t_1$;

control the device to hold for a second time $t_2$ and record a second pressure $p_2$ within the second time $t_2$, with an interval t between $t_1$ and $t_2$;

calculate a leakage rate of the hub according to a formula L=(p$_1$−p$_2$)V/(tp$_2$);

output that the air tightness of the hub or tyre to be measured is qualified when L is not larger than $5\times10^{-6}$ Pa*m$^3$/s; and output that the air tightness of the hub or tyre to be measured is unqualified when L is larger than $5\times10^{-6}$ Pa*m$^3$/s.

The aluminum alloy hub 1 is an object under detection and is provided with the tyre 2, the tyre pressure sensor 3 and the valve 4; an inflation system is composed of the pressure gage 5, the gas flowmeter 6, the connection pipeline 7, the shut-off valve 8 and the gas source 9; and the notebook computer 10 is provided with a signal receiving device for the tyre pressure sensor and an analysis software for monitoring the change condition of the tyre pressure in real time.

Based on an ideal gas state equation $$pV = \frac{m}{M}RT,$$

the volume of the tyre and hub is set to be V, a pressure during pressurization stopping is set to be $p_1$, a pressure obtained after holding for time t is set to be $p_2$, the temperature of a gas is set to be T, and the amount of a leakage gas from a container is indicated with ΔV. After placement for the time t, by assuming the leakage rates of the tyre and the valve to be 0 at this point, the leakage rate of the hub may be obtained through calculation.

Embodiment 2: Detection Method for Detecting Standard Sample Hub with Detection Device for Aluminum Alloy Air-Tightness Standard Sample Hub As described in Embodiment 1, after the detection device for the aluminum alloy air-tightness standard sample hub is mounted completely, the hub and the tyre are internally inflated with compressed air in a constant-temperature environment at 20° C., wherein the constant pressure of 400 KPa is adopted as the pressure of the gas source, with the flow being 1 m$^3$/h; the inflation is stopped when pressure values from both the pressure gage and the tyre pressure sensor reach 200 KPa, and the inflation time is recorded as 92 seconds; a value displayed by the flowmeter is 1 m$^3$/h constantly, and the volume of the gas charged to the enclosed spaces of the hub and the tyre can be calculated to be 25.5×10$^{-3}$ m$^3$.

Then the hub and the tyre are placed in the constant-temperature environment at 20° C. for standing, with the time set as 180 days, during which the notebook computer is always in an operating state, and the tyre pressure from the tyre pressure sensor and temperature signals are monitored in real time; if the tyre pressure drop is greater than 20 KPa, the detection is indicated to be failed and stopped; if the tyre pressure drop is smaller than 20 KPa at the end of 180 days, the tyre pressure, e.g. 199.5 KPa, at the moment is recorded; the leakage rate L=4.2×10$^{-12}$ Pa*m$^3$/s of the hub can be obtained through calculation; thus, the hub can be used as the air-tightness standard hub for the purposes of background leakage rate of the helium-based air-tightness device as well as routine calibration.

The device according to Embodiment 1 of the present invention is used to detect 100 hubs to be detected, which are used in production practices, and is compared with a helium-based air-tightness standard detection device in terms of detection result. Results show that among the 100 hubs to be detected, which are detected by the detection device for the aluminum alloy air-tightness standard sample hub, a deviation of more than 99% of the detection results obtained by the detection device provided by the present invention is within ±1% relative to the detection results of the helium-based air-tightness standard detection device, which can fully meet production requirements.

Embodiment 3: Selection of Aluminum Alloy Air-Tightness Standard Sample Hub

As described in Embodiments 1 and 2, based on the probability theory, 10 cast aluminum alloy hubs and 10 forged aluminum alloy hubs are randomly selected during each detection and are subjected to air-tightness detection by using the detection device for the aluminum alloy air-tightness standard sample hub. Results show that the air tightness of the forged aluminum alloy hubs is superior to that of the cast aluminum alloy hubs, and may reach 10$^{-13}$ Pa*m$^3$/s, and the hub with the minimum leakage rate can be selected as the air-tightness standard sample hub for use each time.

Those skilled in the art may easily know that the hub and the tyre are in a matching state under a detection state. If a hub-tyre system is in a qualified state during detection, the tyre is certainly indicated to be in a qualified state in terms of air tightness. Therefore, the device and method provided by the present invention may also be used for measuring the air tightness of the tyre.

The invention claimed is:

1. A device for measuring air tightness of an aluminum alloy hub or a tyre, comprising:
    a pressure measurement device mounted into the hub or the tyre to be measured, an inflation device in gas connection with the inside of the tyre of a wheel to be measured, and a data acquiring and processing device,
    wherein the inflation device comprises a flow measurement component;
    wherein the data acquiring and processing device comprises a data acquiring device and a data processing device, the data acquiring device being configured to receive tyre pressure data from the tyre pressure sensor, and transmit the tyre pressure data to the data processing device;
    wherein the data processing device is a single-chip microcomputer or an electronic computer; and
    wherein the single-chip microcomputer internally stores a control and analysis software, which is configured to:
    read temperature from the tyre pressure sensor when the measurement begins, control to inflate enclosed spaces of the tyre and the hub with compressed air when the temperature is stable, close a valve and the shut-off valve when a first pressure $p_1$ is reached within a first time $t_1$, and record an accumulated inflation flow value V within the first time $t_1$;
    control the device to hold for a second time $t_2$ and record a second pressure $p_2$ within the second time $t_2$, with an interval t between $t_1$ and $t_2$;
    calculate a leakage rate of the hub according to a formula L=$(p_1-p_2)$V/$(tp_2)$;
    output that the air tightness of the hub or tyre to be measured is qualified when L is not larger than 5×10$^{-6}$ Pa*m$^3$/s; and
    output that the air tightness of the hub or tyre to be measured is unqualified when L is larger than 5×10$^{-6}$ Pa*m$^3$/s.

2. The device for measuring the air tightness of the aluminum alloy hub or the tyre according to claim 1, wherein the pressure measurement device is a tyre pressure sensor mounted inside a tyre on an aluminum alloy hub.

3. The device for measuring the air tightness of the aluminum alloy hub or the tyre according to claim 1, wherein the inflation device comprises a pressure gage, a gas flowmeter, a connection pipeline, a shut-off valve and a gas source, the pressure gage being in gas connection with the inside of the tyre on the aluminum alloy hub and being in gas connection with the gas flowmeter, the gas flowmeter being in gas connection with the shut-off valve through the connection pipeline, and the shut-off valve being in gas connection with the gas source.

4. The device for measuring the air tightness of the aluminum alloy hub or the tyre according to claim 1, wherein the first pressure $p_1$ is 180 kPa to 220 kPa, and preferably 200 kPa.

5. The device for measuring the air tightness of the aluminum alloy hub or the tyre according to claim 1, wherein the tyre pressure sensor is a real-time detection sensor.

* * * * *